United States Patent
Friedmann

[19]

[11] Patent Number: 6,017,286
[45] Date of Patent: Jan. 25, 2000

[54] POWER TRAIN

[75] Inventor: Oswald Friedmann, Lichtenau, Germany

[73] Assignee: Luk Getriebe-Systems GmbH, Buhl/Baden, Germany

[21] Appl. No.: 08/827,648

[22] Filed: Apr. 10, 1997

Related U.S. Application Data

[63] Continuation of application No. 08/572,538, Dec. 14, 1995, Pat. No. 5,667,448.

[30] Foreign Application Priority Data

Dec. 15, 1994 [DE] Germany ............................. 44 44 648
Dec. 21, 1994 [DE] Germany ............................. 44 45 648

[51] Int. Cl.$^7$ .................................................. F16H 61/00
[52] U.S. Cl. ................................ 474/18; 474/28; 477/46
[58] Field of Search ................................. 474/18, 28, 69; 477/38, 39, 45, 46

[56] References Cited

U.S. PATENT DOCUMENTS

| | | | |
|---|---|---|---|
| 4,193,323 | 3/1980 | Bubula ................................. | 477/68 X |
| 4,261,213 | 4/1981 | Rattunde .................................. | 74/196 |
| 4,369,675 | 1/1983 | Van Deursen ........................ | 474/28 X |
| 4,466,521 | 8/1984 | Hattori et al. ........................ | 477/46 X |
| 4,583,423 | 4/1986 | Hahne .................................. | 474/28 X |
| 4,601,368 | 7/1986 | Van Deursen ........................ | 474/28 X |
| 4,722,718 | 2/1988 | Eugen ....................................... | 474/19 |
| 4,790,214 | 12/1988 | Hattori et al. ............................. | 477/48 |
| 5,046,991 | 9/1991 | Friedmann ............................... | 474/18 |
| 5,169,365 | 12/1992 | Friedmann ............................... | 474/18 |
| 5,217,412 | 6/1993 | Indlekofer et al. ....................... | 474/69 |
| 5,295,915 | 3/1994 | Friedmann ............................... | 474/18 |
| 5,667,448 | 9/1997 | Friedmann ............................... | 474/18 |

FOREIGN PATENT DOCUMENTS 615079   9/1994   European Pat. Off. .

*Primary Examiner*—Roger J. Schoeppel
*Attorney, Agent, or Firm*—Darby & Darby

[57] ABSTRACT

A power train for use in motor vehicles has an infinitely variable transmission with two adjustable sheaves, an endless flexible torque transmitting element trained over the sheaves, and at least one hydraulic adjusting unit for each of the sheaves. The adjusting units receive pressurized fluid from a pump and the pressure of such fluid, and hence the extent of frictional clamping engagement between the sheaves and the flexible element, is regulated by a torque sensor including a plenum chamber with an outlet having an effective cross-sectional area which is variable in dependency upon variations of torque being applied to the torque sensor by the engine of the vehicle. The energy of fluid leaving the plenum chamber is used to operate a jet pump which draws fluid from a source for lubrication and/or cooling of the transmission and/or one or more clutches forming part of the power train.

10 Claims, 1 Drawing Sheet

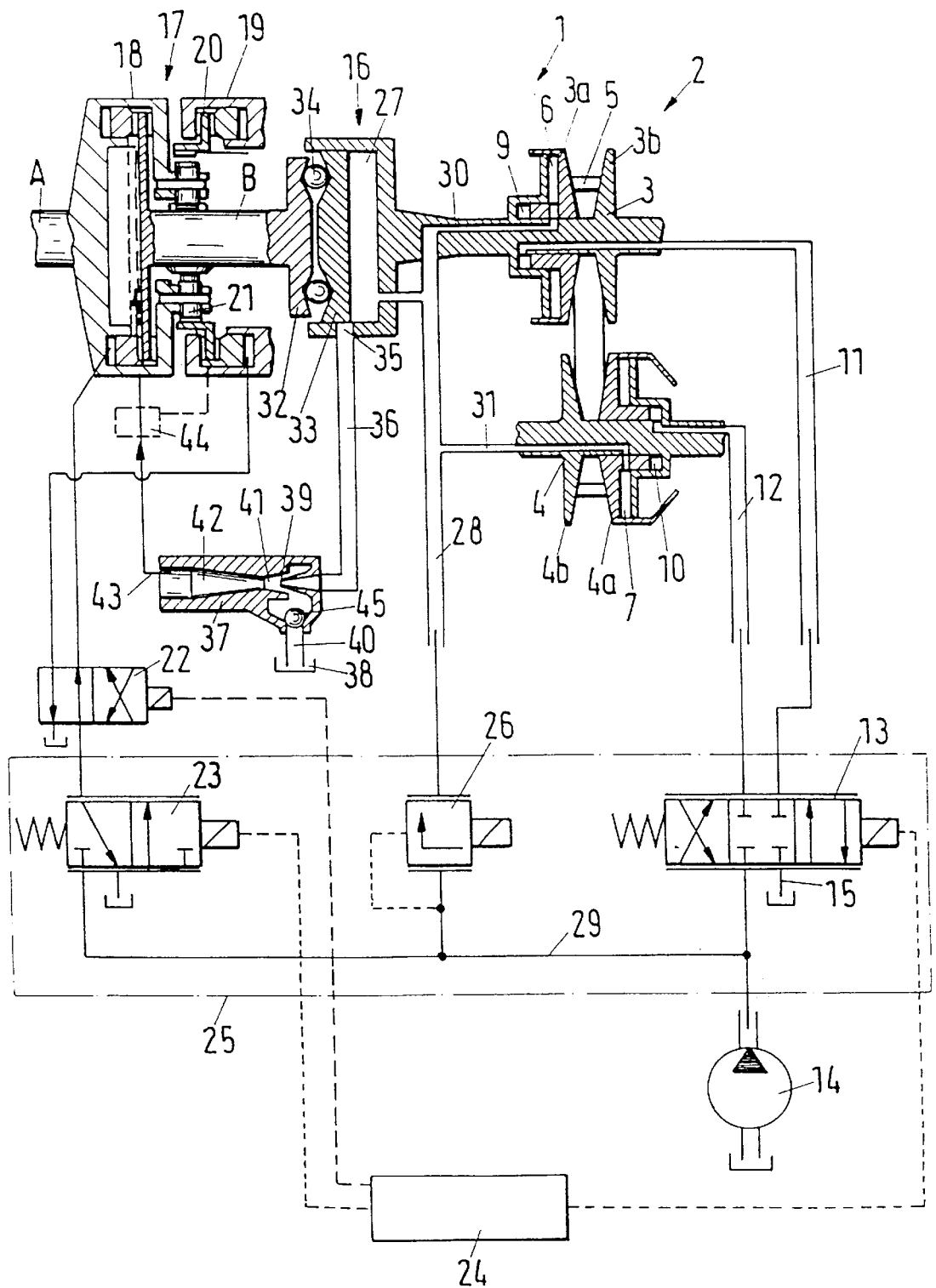

POWER TRAIN

CROSS-REFERENCE TO RELATED CASES

This is a continuation of Ser. No. 08/572,538 filed Dec. 14, 1995, now U.S. Pat. No. 5,667,448 granted Sep. 16, 1997.

BACKGROUND OF THE INVENTION

The invention relates to improvements in power trains which can be utilized in motor vehicles for the transmission of torque from a prime mover (e.g., a combustion engine) to one or more driven parts such as the wheels of the vehicle. More particularly, the invention relates to improvements in power trains which embody infinitely variable transmissions of the type having first and second adjustable pulleys or sheaves and an endless flexible element which is trained over and serves to transmit torque between such sheaves.

Infinitely variable transmissions embodying two sheaves and an endless flexible torque transmitting element further comprise at least one adjusting unit for each of the adjustable sheaves to vary the friction (i.e., the clamping engagement) between the coaxial flanges of the respective adjustable sheave and the adjacent loop-shaped portion of the flexible element. As a rule, such power trains further comprise a hydromechanical torque monitoring device or sensor which transmits to at least one of the sheaves a portion of the torque being supplied by a prime mover. The torque sensor comprises at least one plenum chamber which receives pressurized hydraulic fluid from at least one surce (such as a gear pump or a vane pump). The outlet of the plenum chamber discharges fluid by way of one or more adjustable flow restrictors, e.g., by way of a throttle having at least two mobile valving elements disposed at the outlet of the plenum chamber and being movable relative to each other to an extent which is determined by the magnitude of applied torque to establish at least one fluid pressure serving to determine the magnitude of frictional clamping engagement between the flanges of the adjustable sheaves and the flexible element of the infinitely variable transmission.

Power trains of the above outlined character are disclosed, for example, in German patent No. 28 28 347 and in published German patent applications Nos. 40 36 683, 42 34 294, 42 01 692 and 35 38 884. In several of the power trains which are disclosed in the above enumerated publications, the fluid pressure which is selected by the torque sensor is dependent upon the applied torque as well as upon the load. It can be said that such torque sensors constitute or act not unlike torque- and/or transmission ratio dependent valves with throttling portions disposed downstream of the plenum chamber of the torque sensor. The plenum chamber receives pressurized hydraulic fluid from a pump and the throttling portion of the torque sensor is closed, at least in part, in response to detection of abrupt changes of transmitted torque. This entails a corresponding rise of pressure in the plenum chamber, and such rise of pressure is communicated to the fluid in the adjusting units for the sheaves of the infinitely variable transmission by way of suitable channels, conduits and/or other passages so that the adjusting units cause the respective sheaves to move into more or less pronounced frictional torque transmitting or torque receiving engagement with the adjacent portions of the endless flexible torque transmitting element of the transmission. In many instances, the adjusting units comprise hydraulic cylinder and piston arrangements.

The aforementioned valving elements of many known torque sensors are or resemble discs having confronting cam faces or tracks which preferably bear upon spherical and/or otherwise configurated rolling elements between them. The pressurized fluid in the plenum chamber of the torque sensor causes the valving elements to bear upon the rolling elements between them. When the transmitted torque undergoes an abrupt change, particularly when the torque which is being transmitted by a prime mover to the respective valving element abruptly develops a peak, te valving elements move away from each other in the axial direction of the torque sensor whereby one of these valving elements changes the rate at which pressurized fluid can flow from the plenum chamber.

The valving elements of the aforediscussed conventional torque sensors constitute a means for mechanically transmitting at least a portion of applied torque and for varying the fluid pressure in the plenum chamber (by varying the effective cross-sectional area of the outlet of the plenum chamber) in dependency upon changes of applied torque in order to influence the extent of frictional clamping engagement between the endless flexible element (e.g., a chain) and at least one adjustable sheave of the infinitely variable transmission.

It is also known to utilize the hydraulic fluid which leaves the plenum chamber of the torque sensor as a lubricant for the parts of the infinitely variable transmission.

The disclosure in commonly owned copending patent application titled: "Power Train with infinitely variable Ratio Transmission", Ser. No. 08/572,536, filed Dec. 14, 1995, inventor: Oswald Friedmann, Urban Panther and Ivo Agner, and the disclosure in the co-pending, commonly owned patent application titled: "Torque Monitoring Apparatus", Ser. No. 08/568,134, filed Dec. 6, 1995, now U.S. Pat. No. 5,711,730, inventors: Oswald Friedmann and Armin Veil, are both incorporated herein, in their entirety, by this reference.

OBJECTS OF THE INVENTION

An object of the invention is to provide a novel and improved power train wherein the hydraulic fluid leaving the plenum chamber of the torque sensor can be utilized more efficiently than in conventional power trains.

Another object of the invention is to provide a power train wherein the fluid leaving the plenum chamber of the torque sensor can be used for more than a single purpose, such as for lubrication and/or cooling of one or more components.

A further object of the invention is to provide a power train wherein the energy of fluid leaving the plenum chamber of the torque sensor can be put to use in a novel and improved way.

An additional object of the invention is to provide a novel and improved pump-torque sensor combination for use in a power train.

Still another object of the invention is to provide a power train which can be operated properly not only at normal but also at extreme temperatures of the hydraulic fluid.

A further object of the invention is to provide a novel and improved cooling and/or lubricating system for the friction clutch or friction clutches of the power train.

Another object of the invention is to provide a power train which can operate satisfactorily with a relatively small source of pressurized hydraulic fluid.

An additional object of the invention is to provide a motor vehicle which embodies the above outlined improved power train.

Still another object of the invention is to provide a power train whose operation is more economical than that of heretofore known power trains employing infinitely variable transmissions with adjustable sheaves.

SUMMARY OF THE INVENTION

The invention is embodied in a power train which can be utilized in a motor vehicle and comprises an infintely variable transmission including a first adjustable rotary sheave adapted to receive torque from a prime mover (e.g., from the output shaft of an engine in a motor vehicle), a second rotary sheave adapted to receive torque from the first sheave by way of at least one endless flexible element (e.g., a belt or a chain) which is trained over the sheaves, and at least one adjusting unit (such as a cylinder and piston assembly) for each sheave. The units are regulatable to vary the magnitude of torque being transmitted between the at least one flexible element and the respective sheaves, and the power train further comprises a hydromechanical torque sensor which is connected between at least one of the sheaves and the prime mover and is operative to transmit at least a portion of torque being transmitted by the prime mover. The torque sensor has a plenum chamber, means for connecting the plenum chamber with a source of pressurized hydraulic fluid, an outlet for evacuation of fluid from the plenum chamber and at least two valving elements disposed at the outlet of the plenum chamber and movable relative to each other to establish at the outlet at least one fluid pressure which is a function of the magnitude of transmitted torque and determines the regulation of torque by the units. In accordance with a feature of the invention, the power train further comprises a jet pump having a first inlet connected with the outlet of the torque sensor and a second inlet which is connected with a source of hydraulic fluid.

The plenum chamber is preferably connected with a first source of hydraulic fluid (e.g., with a gear pump or another rotary pump), and the second inlet of the jet pump is preferably connected with a discrete second source of hydraulic fluid, e.g., with a reservoir.

The power train can further comprise a check valve which is disposed at one of the inlets of the jet pump. Such check valve is or can be provided at the second inlet and can be integrated into the jet pump.

The jet pump has an outlet which can discharge hydraulic fluid for use as a coolant in at least one component, e.g., in a friction clutch. Alternatively or in addition to serving as a means for supplying a coolant, the outlet of the jet pump can discharge hydraulic fluid for use as a lubricant.

The power train can comprise at least one clutch, and the outlet of the jet pump can be connected with the at least one clutch to supply hydraulic fluid which is used in the at least one clutch. The at least one clutch can constitute a friction clutch, e.g., a starter clutch which is connected between the prime mover and the torque sensor.

The novel features which are considered as characteristic of the invention are set forth in particular in the appended claims. The improved power train itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The single FIGURE of the drawing is a diagrammatic partly elevational and partly sectional view of a power train which can be utilized in a motor vehicle and employs the novel combination of torque sensor and jet pump.

DESCRIPTION OF PREFERRED EMBODIMENTS

The drawing shows certain component parts of a power train 1 which can be utilized in a motor vehicle and receives torque from a rotary output component A, such as a crankshaft or a camshaft receiving torque from a combustion engine, not shown. Reference may be had, for example, to the drawing of the commonly owned U.S. Pat. No. 5,169,365.

The power train 1 comprises an infinitely variable transmission 2 with a first adjustable rotary sheave 3, a second adjustable rotary sheave 4 and an endless torque transmitting element 5, such as a flexible chain or belt which is trained over the sheaves 3 and 4. The sheave 3 can receive torque from the output component A and the sheave 4 can receive torque from the sheave 3 by way of the endless flexible element 5. The sheaves 3 and 4 respectively comprise axially fixed conical flanges 3b and 4b as well as axially movable flanges 3a and 4a. A first adjusting unit 6, here shown as a fluid-operated motor, is regulatable to vary the magnitude of torque being transmitted from the sheave 3 to the flexible element 5 by moving the flange 3a axially of and relative to the flange 3b. A second adjusting unit 7, also shown in the form of a fluid-operated motor, is regulatable to vary the magnitude of torque being transmitted between the flexible element 5 and the sheave 4 by moving the flange 4a axially of and relative to the flange 4b.

The means for varying the ratio of the transmission 2 comprises a further fluid-operated cylinder and piston unit 9 which operates in parallel with the unit 6, and a cylinder and piston unit 10 which operates in parallel with the unit 7. Depending on the desired ratio of the transmission 2, the cylinder chambers of the units 9 and 10 are caused to receive pressurized hydraulic fluid (such as oil) from a source 14 (e.g., a rotary gear pump or vane pump) or to discharge fluid into a sump by way of a valve 13 and conduit 15. The valve 13 can establish a path for the flow of pressurized hydraulic fluid from the pump 14 into the cylinder chamber of the unit 9 by way of a conduit 11 and to the cylinder chamber of the unit 10 by way of a conduit 12. The conduits 11 and 12 further serve to convey fluid from the chambers of the units 9, 10 back into the sump (by way of the conduit 15) in response to appropriate actuation of the valve 13. A change in the ratio of the transmission 2 necessitates a change in the relationship of fluid pressures in the cylinder chambers of the units 9 and 10.

The power train 1 further comprises a hydromechanical torque monitoring device or sensor 16. The sensor 16 can establish fluid pressures which are dependent at least upon the magnitude of transmitted torque and is installed between the output component A and the sheave 3 of the transmission 2 to transmit to the sheave 3 at least a portion of the torque being applied by the output component. A clutch assembly 17 which is installed between the output component A of the prime mover (such as the combustion engine of a motor vehicle) and the torque sensor 16 comprises a starter clutch 18 and preferably also a second clutch 19 serving to reverse the direction of rotation of an intermediate shaft B which transmits torque to the sensor 16. The clutches 18, 19 of the assembly 17 are or can constitute friction clutches. The clutch 19 is engaged when the operator of the vehicle desires to reverse the direction of travel of the vehicle. The exact design of the clutch 19 forms no part of the invention; this clutch can comprise a friction clutch 20 acting as a brake and a planetary 21 which is installed between the brake 20 and the intermediate shaft B.

The clutch 18 and the brake 20 of the clutch 19 are hydraulically operated clutches and can be engaged or disengaged in response to appropriate actuation of a switchover valve 22 and a regulating valve 23. These valves determine whether the planetary 21 can rotate the intermediate shaft B by way of the clutch 18 or by way of the brake 20 of the clutch 19, depending upon the desired setting of the power train 1. The valve 23 regulates the operation of the valve 22 and thus determines the condition of the clutch 18 and/or the brake 20. A central electronic control unit 24 is provided at least for the valves 13, 22 and 23 and is influenced by one or more operational parameters of the motor vehicle embodying the power train 1. Reference may be had to the control unit in the power train of the aforementioned U.S. Pat. No. 5,169,365. Such parameters include or can include those of the engine driving the output component A as well as those of the infinitely variable transmission 2. The valves 13, 22, 23 and a further valve 26 can be assembled into a valve block 25. The drawing shows that the block 25 encompasses the valves 13, 22 and 26.

The valve 26 is a pressure regulating valve which is installed in a conduit 28 serving to convey fluid from the outlet of the pump 14 (by way of a further conduit 29) to a plenum chamber 27 of the sensor 16 as well as to a conduit 30 supplying fluid to the cylinder chamber of the adjusting unit 6 for the sheave 3. The purpose of the valve 26 is to ensure that the fluid pressure in the conduit 29 (leading from the pump 14 to the valves 22 and 23) does not drop below a preselected value even when the pressure of fluid in the plenum chamber 27 is relatively low. The conduit 28 further supplies fluid to a conduit 31 which supplies fluid to the cylinder chamber of the adjusting unit 7 for the sheave 4. The pressure of fluid in the cylinder chambers of the adjusting units 6 and 7 is a function of the fluid pressure in the plenum chamber 27 of the torque sensor 16.

The sensor 16 can be said to constitute a torque regulated valve which transmits torque from the intermediate shaft B to the sheave 3. This sensor comprrises two coaxial disc-shaped valving elements 32, 33 and a set of spherical rolling elements 34 between the valving elements. The valving element 32 cannot move axially of the sensor 16 and is or can be of one piece with the intermediate shaft B. The element 33 is movable axially relative to the element 32 and bounds a portion of the plenum chamber 27. The rolling elements 34 are in contact with the surfaces of ramps forming part of the valving elements 32 and 33. The axial position of the valving element 33 determines the extent to which the outlet 35 of the plenum chamber 27 permits the outflow of pressurized hydraulic fluid from the chamber 27 into a conduit 36 leading to a first inlet of a jet pump 37.

A change of the magnitude of torque being transmitted between the valving elements 32 and 33 effects a change in the axial position of the valving element 33 and hence in the rate of fluid flow between the outlet 35 of the plenum chamber 27 and the conduit 36. This ensures that the pressure of fluid in the chamber 27, in the conduits 28, 30, 31 as well as in the cylinder chambers of the adjusting units 6, 7 corresponds to the magnitude of torque to be transmitted by the transmission 2.

The pressure of fluid (such as oil) leaving the plenum chamber 27 of the torque sensor 16 by way of the outlet 35 is relatively high, i.e., the energy of such fluid is also high. This energy is utilized in the jet pump 37 to draw hydraulic fluid from a discrete second source 38 (such as a tank or another suitable reservoir) by way of a second inlet 40 of the pump 37. The outlet of the jet pump 37 can transmit fluid entering its first inlet by way of the conduit 36 and its second inlet 40 to one or more components of the power train 1 or of the motor vehicle utilizing such power train wherein the fluid is used as a coolant and/or as a Lubricant. The fluid which enters the first inlet of the jet pump 37 by way of the conduit 36 acts not unlike a propellant. Such propellant enters the pump 37 by way of a conical nozzle 39 at the discharge end of the conduit 36 which accelerates the fluid whereby the pressure of such fluid decreases accordingly. This enables the second inlet 40 of the pump 37 to draw fluid from the respective source 38. An intercepting or mixing nozzle 41 of the jet pump 37 effects an exchange of speeds between the two incoming fluid flows, i.e., between that supplied by the conduit 36 and that drawn from the source 38 by way of the second inlet 40. A diffusor 42 of the jet pump 37 determines the pressure of the fluid entering a conduit 43 which connects the outlet of the jet pump with the starter clutch 18.

As mentioned above, the fluid entering the chamber of the clutch 18 can be used at least as a coolant and/or as a lubricant. The conduit 43 preferably comprises a further valve 44 (the design of this valve is or can be identical with that of the valve 22) which can direct fluid from the outlet of the jet pump 37 into the clutch 19 in addition to or in lieu of admission of fluid into the clutch 18. The operation of the valve 44 is or can be controlled by the central electronic control unit 24.

The outlet of the jet pump 37 can further serve as a means for supplying fluid for lubrication of certain parts of the infinitely variable transmission 2. A branch (not shown) of the conduit 36 and/or 43 can be provided with one or more flow restrictors (not specifically shown) and can deliver fluid from the conduit 36 and/or from the pump 37 to one or more additional components of the power train 1 for the purpose of cooling and/or as a lubricant.

The reference character 45 denotes a check valve which is installed in the inlet 40 or (as shown) directly in the pump 37 and can permit the fluid to flow only in a direction from the source 38 into the nozzle 41. An advantage of the check valve 45 is that it prevents the flow of cool and highly viscous fluid (such as oil) from the pump 37 into the source 38 by way of the second inlet 40. When the temperature is low, losses which develop in the pump 37 and in various conduits, passages and/or channels can be so high that the pump 37 can no longer draw fluid from the source 38, i.e., only the first inlet receives fluid by way of the nozzle 39 at the discharge end of the conduit 36. Furthermore, the consistency (high viscosity) of fluid at low or very low temperatures can adversely influence the operation of the pump 37. At such times, particularly when the temperature of fluid in the source 38 is very low, the check valve 45 ensures that at least that stream of fluid which enters the pump 37 by way of the conduit 36 can be admitted into the conduit 43 for introduction into the clutch assembly 17.

An important advantage of the improved power train 1 is that its jet pump 37 ensures the admission of adequate quantities of fluid into the clutch assembly 17, into the transmission 2 and/or into one or more additional components of the power train under all, or practically all, circumstances of use. This ensures adequate cooling and/or lubrication of all parts which must be cooled and/or lubricated or superior cooling and/or lubrication of such parts. Moreover, the jet pump 37 (or an equivalent pump) is simple and relatively inexpensive and can be assembled with a standard check valve 45 or an equivalent one-way valve. The latter can be integrated into the jet pump 37.

An important advantage of the illustrated jet pump 37 is its simplicity and hence a reasonable cost. Moreover, the operation of this pump is simple because it need not embody any moving parts. At the same time, the jet pump 37 renders it possible to take advantage of the still relatively high pressure of fluid entering the nozzle 39 via conduit 36 so that such high pressure can be utilized to draw additional fluid from the source 38 for introduction into the conduit 43 jointly with fluid which is admitted by the conduit 36 and nozzle 39. As already mentioned above, the jet pump 37 renders it possible to use the fluid which is supplied via conduit 36 as a propellant which is accelerated while issuing from the nozzle 39 with attendant drop of pressure. This is utilized to draw fluid from the source 38, through the inlet 40 and into the nozzle 41. The fluid streams or flows entering the jet pump 37 are mixed in the interior of this pump with attendant reduction of the speed of the mixture flowing beyond the nozzle 41 and into the diffusor 42 prior to entering the conduit 43.

An advantage of the improved power train 1 is that the high static energy of fluid in the plenum chamber 27 of the torque sensor 16 is converted into kinetic energy by the jet pump 37 and the attendant drop of fluid pressure is utilized to suck fluid from the source 38 through the second inlet 40 of the jet pump and to convey the thus drawn second stream or flow of fluid into the conduit 43 for admission into the clutch assembly 17, into the transmission 2 and/or into other components of the power train 1, e.g., for the purposes of lubrication and/or of maintaining the temperature of the fluid-receiving parts within a desired range.

Since the jet pump 37 need not comprise any moving parts (such as those which are necessary in a gear pump, a vane pump or another rotary pump), the pump 37 is relatively compact and inexpensive and can be readily installed in certain types of existing power trains without substantial modifications. Moreover, the power train 1 can employ a relatively small, compact and inexpensive pump 14 because the latter is not called upon to supply all of the fluid which is needed in the adjusting units 6, 7, 9, 10, in the torque sensor 16, in the clutch assembly 17 and/or in other parts of the power train for the purposes of cooling, lubrication, actuation and/or others.

It has been found that the novel and improved combination of torque sensor 16 and jet pump 37 can be utilized with particular advantage in power trains wherein at least one sheave (3 or 4) of the infinitely variable transmission 2 is adjustable by a fluid-operated unit (6 or 7) which operates in parallel with a fluid-operated unit (9 or 10) serving to select the ratio of the transmission 2. Thus, the axially movable flange (3a or 4a) of the sheave 3 or 4 can be displaced by two adjusting units (6, 9 or 7, 10) one of which adjusts in dependency upon the torque indicating pressure and the other of which adjusts in dependency upon the transmission ratio indicating pressure of the hydraulic fluid. Due to a parallel connection between the adjusting units for the axially movable flanges 3a and 4a, the axial forces which are generated by the respective adjusting units 6, 9 and 7, 10 are added to each other. Particularly satisfactory results are obtained when each of the axially movable flanges 3a, 4a is movable axially by a pair of parallel connected adjusting units (6, 9 or 7, 10). Reference may be had, for example, to published German patent application No. 40 36 643 which discloses dual fluid-operated adjusting units for each of the sheaves of an infinitely variable transmission. This publication discloses a discrete pump for each of the two circuits, i.e., one for the torque-dependent circuit and the other for the circuit which is to effect changes of the ratio of the transmission. However, it is equally possible to employ a single pump with a set of necessary valves which control the distribution of pressures and the volumetric flow of fluid serving to effect a shift of movable flanges in the two adjustable sheaves.

The utilization of dual adjusting units (such as the cylinder and piston units 6, 9 and 7, 10) for the sheaves 3 and 4 renders it possible to employ a single source (14) of pressurized fluid for the two sheaves and to utilize a relatively small source of pressurized fluid because such source need not supply fluid for the purposes of lubrication and/or cooling. Otherwise stated, the fluid which is being supplied by the source 14 need not suffice to satisfy the requirements of the clutch assembly 17 and/or to supply all of the fluid which is needed to cool parts of the transmission 2 because the fluid issuing from the plenum chamber 27 can be used to operate the jet pump 37 so that the latter can draw fluid from the source 38. The starter clutch 18 is particularly likely to require relatively large quantities of fluid for the purposes of lubrication and/or cooling. Due to the provision of the novel combination of torque sensor 16 and jet pump 37, all of the fluid which is needed to cool and/or lubricate the clutch 18 need not be supplied by the source 14.

The novel combination of torque sensor 16 and jet pump 37 renders it possible to utilize the energy of fluid leaving the plenum chamber 27 for the purpose of drawing additional fluid into the hydraulic circuit of the improved power train 1 to thus increase the quantity of available fluid without resorting to a large source 14 and/or to a second source which, in contrast to the jet pump 37, comprises moving parts and must be driven by a motor or the like. This entails substantial savings in energy and renders it possible to provide a relatively simple and compact power train.

Since the efficiency of a jet pump is relatively low, experts in the field of transmissions of the type employing adjustable sheaves and hydraulically operated adjusting units or motors therefor have considered the utilization of a jet pump as an unsatisfactory solution of the problem of supplying adequate quantities of fluid without resorting to an overly large, bulky and expensive source of pressurized fluid. However, actual tests which were carried out with the novel combination of torque sensor 16 and jet pump 37 clearly indicate that the quantities of additional fluid supplied by the jet pump suffice, at least in most instances, to satisfy the need for the provision of relatively large quantities of fluid for the purposes of cooling and/or lubrication.

The pressure of fluid flowing through the conduit 43 to the clutch assembly 17 can be relatively low or extremely low (e.g., just above atmospheric pressure), as long as the fluid can enter the clutch assembly 17 and more specifically that part or those parts of such assembly which require lubrication and/or cooling. When the temperature of fluid matches or at least approximates the operational temperature, the jet pump 37 can draw from the source 38 a quantity of fluid which constitutes up to 30 percent of fluid being supplied by the source 14.

The check valve 45 (which can be of any conventional design) is installed or incorporated in or associated with the jet pump 37 in such a way that fluid which is being supplied by the conduit 36 cannot flow from the pump 37 into the second inlet 40 and thence into the source 38 but is compelled to enter the conduit 43. Such check valve ensures that the clutch assembly 17 receives at least that quantity of fluid which leaves the plenum chamber 27 of the torque sensor 16 by way of the outlet 35 to enter the conduit 36. In the absence of the check valve 45, fluid entering the jet pump 37 via conduit 36 would be likely to flow into the source 38, rather than into the conduit 43, when the temperature of such fluid is very low, e.g., less than −10° C. At such low temperatures, the viscosity of the fluid is likely to be so low that internal losses in the jet pump 37 (particularly due to friction) cause the energy of the fluid entering via conduit 36 to be consumed to a value at which the pump 37 can no longer ensure predictable advancement of fluid from the conduit 36 into the conduit 43 if the check valve 45 (or an equivalent of such check valve) is omitted, at least not under all circumstances of use of the power train. It has been found that, at least in most instances, the quantity of fluid entering the jet pump 37 via conduit 36 and leaving the jet pump via conduit 43 suffices to adequately lubricate the clutch assembly 17, even when the temperature is extremely low, i.e., when the fluid is very cold.

Another important advantage of the jet pump 37 is that its inlet 40 need not draw fluid from the source 38 by way of one or more filters. The reason is that such fluid can be supplied from the jet pump 37 directly to the one and/or the other clutch of the assembly 17. Consequently, and since the source 14 need not supply all of the fluid which is needed in the power train 1, the filter or filters through which the fluid must flow from the source 14 to the adjusting units 6, 7, 9, 10 and/or elsewhere can be relatively simple, compact and inexpensive.

The disclosure of the U.S. Pat. No. 5,169,365 is incorporated herein by reference, together with the disclosures of all U.S. patents and patent applications corresponding to the aforementioned German patent and published German patent applications.

The improved power train is susceptible of numerous additional modifications without departing from the spirit of the invention. For example, the jet pump 37 or an equivalent pump can be used in combination with other types of torque sensors, e.g., with torque sensors of the character disclosed in the commonly owned copending patent application filed by Oswald Friedmann and Armin Veil for "Torque Monitoring Apparatus". Furthermore, the invention can be embodied in modifications of the aforediscussed U.S. and German patents and/or of the aforediscussed U.S. and German patent applications.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A power train comprising an infinitely variable transmission including a first adjustable rotary sheave arranged to receive torque from a prime mover, a second adjustable rotary sheave arranged to receive torque from said first sheave by way of at least one endless flexible element which is trained over said sheaves, and at least one adjusting unit for each of said sheaves, said units being regulatable to vary the magnitude of torque being transmitted between said at least one flexible element and the respective sheaves, means for connecting said adjusting units with a source of pressurized hydraulic fluid, an outlet for evacuation of fluid from said adjusting units, a jet pump having at least one inlet connected with a source of hydraulic fluid and an outlet, and at least one clutch having an adjusting unit connected with said outlet of said jet pump.

2. The power train of claim 1, wherein said adjusting units for said sheaves are connected with a first source of hydraulic fluid and said at least one inlet of said jet pump is connected with a discrete second source of hydraulic fluid.

3. The power train of claim 1, wherein said jet pump has two inlets and further comprising a check valve at one of said inlets.

4. The power train of claim 3, wherein said check valve is provided at said at least one inlet.

5. The power train of claim 3, wherein said check valve is integrated into said jet pump.

6. The power train of claim 1, wherein said outlet of said jet pump is arranged to discharge hydraulic fluid for use as a coolant for at least one component.

7. The power train of claim 1, wherein said outlet of said jet pump is arranged to discharge hydraulic fluid for use as a lubricant.

8. The power train of claim 1, wherein said at least one clutch is a friction clutch.

9. The power train of claim 1, wherein said at least one clutch is a starter clutch.

10. The power train of claim 1, wherein said at least one clutch is connected between said prime mover and said first sheave.

* * * * *